3,532,250
CAKE PAN
George Thomas Gay, Bolton, Ontario, Canada, assignor to Reynolds Aluminum Containers (1965) Limited, Rexdale, Ontario, Canada, a corporation
Filed Oct. 14, 1968, Ser. No. 767,298
Int. Cl. B65d 25/00
U.S. Cl. 220—62                              1 Claim

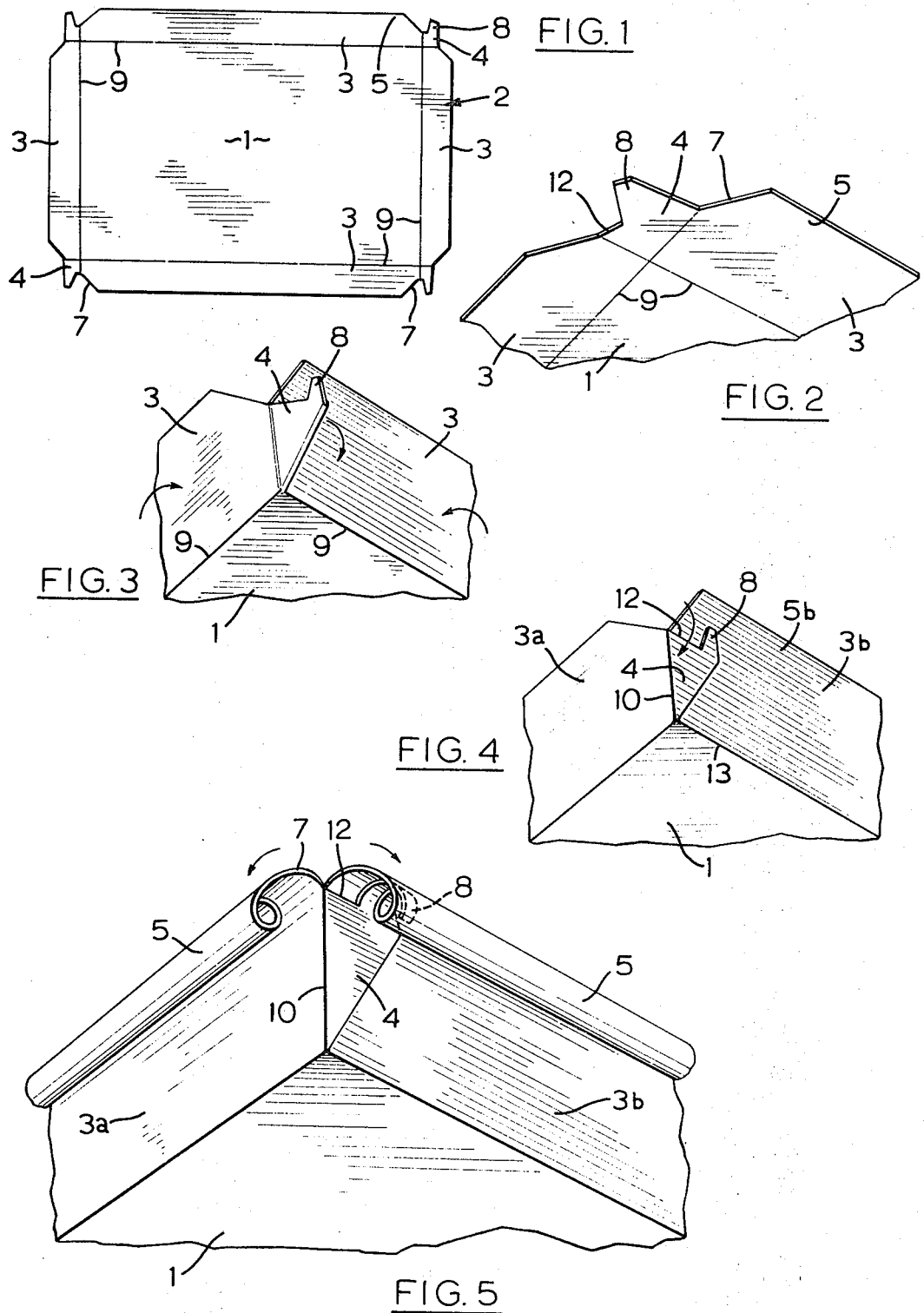

ABSTRACT OF THE DISCLOSURE

A cake pan formed upon a one-piece blank thin gauge metal having four wall portions the upper edge of each of which is provided with a rolled bead, the folded corners of the pan interlocking with the rolled bead so as to retain the pan in its erected condition.

BACKGROUND OF THE INVENTION

This invention relates to cake pans or baking pans of the kind formed from a one-piece blank of thin gauge metal, usually aluminum foil.

In order to provide rigidity in a cake pan or baking pan of this kind, it is known to roll the edges of the blank from which the pan is formed so as to provide a reinforcing, beaded rim; such a beaded rim may extend along all four sides of the pan, or alternatively along the two longitudinal sides only.

In the first case, where all four sides of the pan rim are beaded, it has been impossible to avoid rounded corners in the finished pan, which is thereby rendered unsuitable for subsequent wrapping operations by automatic machinery. In this connection, it is important that the four sides of the pan should be at right angles to one another and to the base of the pan.

In the second case, where only two sides of the pan rim are beaded, exposed raw edges of metal create a nuisance in that they tend to cut the fingers of bakery employees handling the pan, and furthermore the sharp corners of the pan tend to tear the film wrapping material which is subsequently applied.

According to the present invention, these disadvantages are overcome by rolling the edges of the blank to provide a beaded, reinforcing edge, and providing interlocking means which are interleaved with and locked by the rolled edges so as to maintain the perpendicularity of the pan walls to one another and to the base.

In the preferred embodiment of the invention, a cake pan formed from a one-piece blank comprises a rectangular base with an upstanding peripheral wall, the wall consisting of four wall portions each of which is coextensive and integral with a respective side of the base, the ends of the wall portions being connected by gussets each of which is folded against an adjacent wall portion, each of the wall portions having an outer edge portion projecting beyond the gussets, which edge portions are rolled to provide a beaded, reinforcing rim of the cake pan, each gusset having an integral ear-like extension piece which is interleaved with and locked by the rolled edge of the adjacent wall portion.

DETAILED DESCRIPTION OF THE INVENTION

One embodiment of the invention will now be described, by way of example, with reference to the accompanying drawings in which:

FIG. 1 is a plan view of a blank from which the cake pan is formed;

FIG. 2 is an enlarged perspective view of a detail of FIG. 1;

FIGS. 3 and 4 are views of the detail of FIG. 2 at stages of formation of the cake pan from the blank, and FIG. 5 is an underneath perspective view of a detail of the formed cake pan.

The one-piece blank shown in FIG. 1 is formed by stamping out from aluminum sheet thin gauge aluminum foil, less than .005 inch gauge. The blank comprises a rectangular central panel 1, which is adapted to constitute the base of the pan, and a region 2 forming a continuous border extending round the central panel 1, the region 2 being adapted to constitute the walls of the cake pan. The border region 2 comprises four elongated wall portions 3 which are coextensive and integral with the sides of the central panel, and are interconnected by gussets 4. Each wall portion 3 has an outer edge portion 5, that is to say a narrow region lying adjacent to its outer edge, which projects beyond the gussets 4. The ends of the outer edge portions are bevelled as shown at 7. Each gusset 4 is formed with an integral, slightly tapering, ear-like extension piece 8, and these extension pieces extend in directions parallel to one pair of opposite sides of the central panel 1.

In forming the cake pan from the blank, the wall portions 3 are folded about fold lines 9 so as to lie in planes perpendicular to the central panel or base 1, as illustrated in FIG. 3, a fold extending from the adjacent corner of the central panel being thus formed in each gusset 4. In FIG. 3, a folded gusset 4 is shown extending from the end of a wall portion 3a. The gusset 4 is next folded about the newly formed corner 10 (FIG. 4) of the cake pan so as to lie against the adjacent wall portion 3b. It will be noted that the gusset has a short edge 12 which extends parallel to a corresponding edge 13 of the base 1, and that the extension piece 8 now projects above this edge so as to lie against the outer edge portion 5b of the wall portion 3b. The cake pan is completed by rolling the outer edge portions 5 downwardly against the outsides of the wall portions 3, to provide the formation shown in FIG. 5. During the rolling operation, the extension pieces 8 are rolled with the outer edge portions 5b so that they become interleaved with and locked by said portions.

The cake pan so formed (see FIG. 5) comprises a rectangular base 1 having an upstanding peripheral wall consisting of four wall portions, such as 3a, 3b, which are connected at their ends to provide corners. Each wall portion has a rolled upper edge, and each of two non-adjacent wall portions (i.e. the wall portion 3a and the wall portion parallel to it) is formed at each end with an integral extension piece which is interleaved with and locked by the rolled edges of the other two wall portions.

What I claim as my invention is:

1. A cake pan formed from a one-piece blank of thin gauge metal, less than .005 inch gauge, and comprising a rectangular base having an upstanding peripheral wall, the wall consisting of four wall portions each of which is coextensive and integral with a respective side of the base, the ends of the wall portions being connected by gussets each of which is folded against the outside of an adjacent wall portion, each of the wall portions having an outer edge portion projecting beyond the gussets, which edge portions are rolled outwardly to provide a beaded rim of the cake pan, each gusset having an integral ear-like extension piece which is interleaved with and locked by the outwardly rolled edge of the adjacent wall portion.

References Cited

UNITED STATES PATENTS 2,970,094  1/1961  Reardon _____ 220—62
3,038,634  6/1962  Cheeley _____ 220—62
3,219,229  11/1965 Kaufman _____ 220—62

FOREIGN PATENTS 1,119,654  6/1956  France.

GEORGE E. LOWRANCE, Primary Examiner

U.S. Cl. X.R.

229—3.5, 31